United States Patent
Jading et al.

(10) Patent No.: US 8,249,007 B2
(45) Date of Patent: Aug. 21, 2012

(54) MEASUREMENT OF CELL-SPECIFIC REFERENCE SYMBOLS IN THE PRESENCE OF MBMS SINGLE FREQUENCY NETWORK TRANSMISSIONS

(75) Inventors: Ylva Jading, Stockholm (SE); Erik Dahlman, Bromma (SE); Elias Jonsson, Malmö (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 36 days.

(21) Appl. No.: 12/532,166

(22) PCT Filed: Jan. 11, 2008

(86) PCT No.: PCT/SE2008/050032
§ 371 (c)(1),
(2), (4) Date: Jan. 17, 2010

(87) PCT Pub. No.: WO2008/118064
PCT Pub. Date: Oct. 2, 2008

(65) Prior Publication Data
US 2010/0315963 A1    Dec. 16, 2010

(30) Foreign Application Priority Data

Mar. 28, 2007 (SE) ...................................... 0700839

(51) Int. Cl.
*H04W 4/00* (2009.01)
*H04W 72/00* (2009.01)
*H04L 12/66* (2006.01)
(52) U.S. Cl. ......... 370/329; 370/458; 370/463; 455/450

(58) Field of Classification Search ................. 370/310, 370/328, 329, 341, 431, 458, 463; 455/450–453
See application file for complete search history.

(56) References Cited

U.S. PATENT DOCUMENTS

| 7,796,639 B2* | 9/2010 | Buckley et al. ............... 370/465 |
| 2008/0232396 A1* | 9/2008 | Buckley et al. ............... 370/465 |

OTHER PUBLICATIONS

PCT International Search Report, dated Sep. 8, 2008, in connection with International Application No. PCT/SE2008/050032.
PCT International Preliminary Report on patentability, dated Jul. 13, 2009, in connection with International Application No. PCT/SE2008/050032.
3GPP TSG-RAN WG1 #46bis, R1-062990, "Outcome of cell search drafting session", Oct. 9-13, 2006.

(Continued)

*Primary Examiner* — Kerri Rose
(74) *Attorney, Agent, or Firm* — Potomac Patent Group PLLC

(57) ABSTRACT

A network unit of an own cell is operated in a radio communication system utilizing a radio interface that includes a radio frame made up of a number of sub-frames. The own cell serves one or more user equipments. Operation includes obtaining information about a scheduling of MBSFN data transmissions in one or more neighboring cells. The information thereby obtained is used to generate an information signal that, for a given sub-frame, enables the one or more user equipments to determine whether neighboring cell measurements can be performed using a unicast group of Orthogonal Frequency Division Multiple access (OFDM) symbols. The information signal is transmitted to the one or more user equipments, which can then use the information to determine how to locate cell-specific reference symbols when doing measurements of neighboring cells.

12 Claims, 9 Drawing Sheets

OTHER PUBLICATIONS

3GPP TSG-RAN WG1 #43, R1-051300, LG Electronics: "MBMS transmission in E-UTRA", Seoul, Korea, Nov. 7-11, 2005.

3GPP TSG-RAN WG1 Meeting #48, R1-070990, Nokia: "Reference Signals for Mixed Carrier MBMS", St Louis, USA, Feb. 12-16, 2007.

Xiaodong, Y. et al: "A survey of handover algorithms in DVB-H", Communications, Surveys & Tutorials, IEEE, vol. 8, No. 4, pp. 16-29, Fourth Quarter 2006.

3GPP TSG-RAN WG1 #49, TdocFM-072282, Nokia Siemens Networks, Nokia: "Mobility and CQI Measurements in Mixed Unicast/MBSFN Carriers", Kobe, Japan, May 7-11, 2007.

Japanese Office Action, dated Oct. 25, 2011, in connection with Japanese Application No. 2010-500871 (See Foreign Attorney's English-language description of the Japanese Office Action below).

Foreign Attorney's English-language description of the Japanese Office Action, dated Oct. 25, 2011, in connection with Japanese Application No. 2010-500871.

Motorola: "Reference signals for mobility related measurements", R1-071330, Mar. 26, 2007, 3GPP TSG RAN WG1 #48bis, St. Julians, Malta, Mar. 26-30, 2007.

Texas Instruments, NTT DoCoMo, Siemens, Philips: "DL RS Structures for Evaluation with 4 Tx Antennas", R1-062998, Oct. 9, 2006.

Qualcomm Europe: "Unicast RS when unicast and MBSFN Multiplexed", R1-071280, Mar. 26, 2007, 3GPP TSG RAN1 #48bis, St. Julians, Malta, Mar. 26-30, 2007.

Alcatel-Lucent: "Location and Role of MCE in LTE Architecture", R3-070646, Mar. 27, 2007, 3GPP TSG-RAN WG3 #55bis, St. Julians, Malta, Mar. 27-30, 2007.

Indonesian Decision to Grant, dated Oct. 18, 2011, in connection with Indonesian Patent Application No. W-00 2009 02704.

Foreign Attorney's English-language description of Indonesian Office Action, dated Aug. 15, 2011, in connection with Indonesian Patent Application No. W-00 2009 02704.

* cited by examiner

MEASUREMENT OF CELL-SPECIFIC REFERENCE SYMBOLS IN THE PRESENCE OF MBMS SINGLE FREQUENCY NETWORK TRANSMISSIONS

CROSS-REFERENCE TO RELATED APPLICATIONS

This application claims priority under 35 U.S.C. §119 to Swedish Patent Application No. 0700839-4, filed Mar. 28, 2007, which is hereby incorporated herein by reference in its entirety.

BACKGROUND

The present invention relates to methods and arrangements in a telecommunication system, and more particularly to methods and arrangements for supporting measurements on cell-specific reference symbols in mobile telecommunications environments that may or may not include one or more MBMS Single Frequency Networks.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high-capacity high-data rate system in existing radio spectrum, a new system has to be able to utilize a bandwidth of varying size. A proposal for such a new flexible cellular system, called Third Generation Long Term Evolution (3G LTE), can be seen as an evolution of the 3G WCDMA standard. This system will use OFDM as the multiple access technique (called OFDMA) in the downlink and will be able to operate on bandwidths ranging from 1.25 MHz to 20 MHz. Furthermore, data rates up to 100 Mb/s will be supported for the largest bandwidth. However, it is expected that 3G LTE will be used not only for high rate services, but also for low rate services like voice. Since 3G LTE is designed for Transmission Control Protocol/Internet Protocol (TCP/IP), Voice over IP (VoIP) will likely be the service that carries speech.

The physical layer of a 3G LTE system includes a generic radio frame having a duration of 10 ms. FIG. 1a illustrates one such frame 100 for an LTE Frequency Division Duplex (FDD) system. Each frame has 20 slots (numbered 0 through 19), each slot having a duration of 0.5 ms which normally consists of seven OFDM symbols. A sub-frame is made up of two adjacent slots, and therefore has a duration of 1 ms, normally consisting of 14 OFDM symbols. As LTE downlink transmission is based on OFDM, this means that, within one OFDM symbol, data is transmitted in parallel on a large number of narrowband subcarriers. Thus, the downlink transmission can be described as a time/frequency grid as illustrated in FIG. 1b, in which each resource element or symbol corresponds to one subcarrier during one OFDM symbol. For an LTE system, the spacing between neighboring subcarriers is 15 kHz, and the total number of subcarriers can be as large as 1200 (for the case of a 20 MHz transmission bandwidth). As also illustrated in FIG. 1b, the subcarriers are grouped into resource blocks, wherein each resource block consists of 12 subcarriers during one 0.5 ms slot. With seven OFDM symbols per slot, there is thus a total of 12×7=84 resource elements in a resource block. One such resource block is illustrated as the shaded area in FIG. 1b.

The radio frame for an LTE Time Division Duplex (TDD) system is similar to that described above for the FDD system, with minor differences. In a TDD system, sub-frames 1 and 7 do not consist of two slots, but rather of three fields (DwPTS, Guard period, and UpPTS). The following discussion, as well as the invention, are applicable to both FDD and TDD systems.

Within each resource block there is a set of resource elements, also known as reference symbols, set to known values. These are illustrated in FIG. 2. Reference symbols can be used by, for example, the User Equipment (UE) to estimate the downlink channel for coherent detection. The reference symbols are also used as part of the LTE mobility function as described below.

As can be seen in FIG. 2, within each resource block there are four reference symbols, two reference symbols within the first OFDM symbol (denoted $R_1$) and two reference symbols in the third from last OFDM symbols (denoted $R_2$). Within the pair of resource blocks corresponding to one sub-frame there are thus a total of eight reference symbols, four reference symbols in the first resource block corresponding to the first slot of the sub-frame and four reference symbols in the second resource block corresponding to the second slot of the sub-frame.

One important aspect of LTE is the mobility function. Hence, procedures are provided for the UE to search for, detect, and synchronize with other cells. To facilitate cell search and synchronization procedures, LTE defines primary and secondary synchronization signals (P-SyS and S-SyS, respectively), which are transmitted on a Primary Synchronization Channel (P-SCH) and a Secondary Synchronization Channel (S-SCH), respectively. The P-SySs and S-SySs are each transmitted twice per frame: once in sub-frame 0, and again in sub-frame 5, as shown in FIG. 1.

The cell-search scheme for LTE can be assumed to consist of the following steps:

1. Detect one out of three possible P-SyS symbols, thereby indicating the 5 ms timing and the cell ID within a currently unknown cell group.

2. Detect frame timing and cell group using the S-SyS. This in combination with the results from step 1 gives an indication of the full cell ID.

3. Use the reference symbols to verify the cell ID. The interested reader is referred to the document R1-062990, entitled "Outcome of cell search drafting session", TSG-RAN WG1 #46bis, Oct. 9-13, 2006 for more information about this proposal.

4. Read the Broadcast Channel (BCH) to receive cell-specific system information.

Once a cell has been found, the UE can use the measured received power of the reference symbols as input to cell selection and handover decisions.

The LTE system also has modes of operation that utilize an extended cyclic prefix length. When this is the case, each slot includes six rather than seven symbols (i.e., 12 OFDM symbols per sub-frame). While this is less efficient from an overhead standpoint, the longer cyclic prefix may be beneficial in specific environments with very extensive delay spread (e.g., very large cells). The reference symbols are still distributed in the first and third from last OFDM symbols in each slot, but in the case of extended cyclic prefixes in unicast operation, this turns out to be the first and fourth symbols, rather than the first and fifth symbols which is the case for normal cyclic prefix lengths.

In addition to unicast operation, LTE radio access networks also include the possibility of downlink Multimedia Broadcast Multicast Service (MBMS) transmissions using MBMS Single Frequency Network (MBSFN) operation. In LTE, an MBMS Single Frequency Network is implemented by having a number of base stations, or evolved Node Bs (eNodeB), to synchronously transmit identical MBMS information within the same resource block (i.e., same group of subcarriers at the same time) and using identical transport formats (i.e., identical coding rate and modulation scheme). For the case of MBSFN transmission, the transmissions from the different eNodeBs involved in the MBSFN transmission will thus be identical. As a consequence, it will be possible for user equipment to simultaneously receive and utilize the energy of all MBSFN transmissions that are received within the time spanned by an OFDM cyclic prefix. This will significantly improve the MBMS reception quality and thus improve the overall MBMS system performance. The set of cells involved in an MBMS transmission based on MBSFN is referred to as an MBSFN Area.

It should be noted that a single cell may be involved in different MBSFN transmissions corresponding to different sets of cells; that is, different only partly non-overlapping MBSFN areas. Such different MBSFN transmissions corresponding to different MBSFN areas are then taking place in different sub-frames.

In connection with MBSFN operation for transmission of MBMS data, the 3rd Generation Partnership Project (3GPP) has agreed on the definition of a number of concepts. These concepts are illustrated in FIG. 3 and defined as follows:

A Multi-cell MBMS Synchronization Area 301 consists of a group of cells on the same frequency band allocated with contiguous coverage within which area all cells are capable of being synchronized and having the possibility of transmitting MBMS data in MBSFN mode. Multi-cell MBMS Synchronization Areas 301 may be configured independently from MBMS Service Area configurations and are capable of supporting one or more MBSFN Areas (see below for definition). It is permissible to define only one Multi-cell MBMS Synchronization Area 301 for a given geographical area and a given frequency band (i.e. multiple Multi-cell MBMS Synchronization Areas in the same geographical area have to be defined on different frequency bands.)

An MBMS Single Frequency Network Area (MBSFN Area) 303 consists of a group of cells with contiguous coverage areas wherein all of these cells are using the same radio resources (and hence the same frequency band) to synchronously transmit a single MBMS service. The MBSFN area 303 belongs to only one Multi-cell MBMS synchronization area 301. MBSFN Area 303 is composed only of actively transmitting cells at a certain point in time.

The Maximum MBSFN Area 305 is the maximum supported geographical extension of an MBSFN Area 303. It may be limited by the multi-cell MBMS synchronization area 301, the MBMS service area (i.e., the area over which MBMS service is to be provided, possibly by building it up from a number of MBSFN areas 303), and operator configuration.

The MBSFN Guard Area 307 is a group of cells that, due to interference considerations, are restricted from using the same radio resources as those of a nearby MBSFN Area 303.

LTE allows for both MBSFN transmission and non-MBSFN transmission using the same carrier in what is called "mixed operation." In mixed operation, some sub-frames are used for MBSFN transmission (so-called "MBSFN sub-frames"), and the remaining sub-frames are used for non-MBSFN transmission (so-called "non-MBSFN sub-frames" or "unicast sub-frames"). However, sub-frames 0 and 5, which include the P-SyS and S-SyS, are always non-MBSFN sub-frames.

Reference symbols are used in the downlink of LTE-systems for demodulation of unicast data and control signalling as well as for measurement purposes. These reference symbols are typically different for neighbour cells (i.e., they are cell specific). However, when an LTE radio access network includes MBSFN transmissions, additional reference symbols are transmitted in sub-frames with MBSFN transmission (i.e., in MBSFN sub-frames). These reference symbols, which can be referred to as MBSFN reference symbols, are identical for all cells involved in the MBSFN transmission (i.e., cell-common). By using the MBSFN reference symbols, the UE can estimate the aggregated channel from all cells involved in the MBSFN transmission. This channel estimate can be used for coherent detection of the combined MBSFN transmission.

FIG. 4 illustrates the overall structure of MBSFN sub-frames in LTE, including the overall reference symbol structure. In this illustration, MBSFN reference symbols are denoted "$R_M$", and unicast reference symbols are denoted "$R_U$". In order to minimize the reference symbol overhead, in MBSFN sub-frames unicast references symbols are only transmitted in the first OFDM symbol of the first slot of the sub-frame (an "MBSFN group of OFDM symbols"). Recalling that non-MBSFN sub-frames comprise first and second reference symbols per slot in each of the first and second slots of the sub-frame, it can be seen that the number of unicast reference symbols transmitted in MBSFN sub-frames has been reduced.

In order to determine the channel quality of a cell, (e.g., in conjunction with a handover), user equipment performs measurements on the unicast reference symbols on an "own cell" (i.e., the cell that is presently serving the user equipment) as well as on neighboring cells. To do this in an efficient way, the user equipment needs to know what reference symbols are available in a given sub-frame. As discussed above, for non-MBSFN sub-frames, these reference symbols are transmitted four times per unicast sub-frame, namely in the first and third from last OFDM symbols of each slot.

However, as also discussed above, in sub-frames with MBSFN operation, only the first reference symbol of the first slot will be present. Thus, the set of unicast reference symbols in MBSFN sub-frames can be viewed as a subset of the unicast reference symbols that are present in non-MBSFN sub-frames. Alternatively, the set of unicast reference symbols in non-MBSFN sub-frames can be viewed as an extended set, compared to the set of unicast reference symbols in MBSFN sub-frames.

Thus, unless a user equipment knows that a sub-frame of a given cell is, definitely, a non-MBSFN sub-frame, the user equipment can only use the first reference symbols of the first slot for measurements, as these are the only reference symbols present in all sub-frame types (i.e., both MBSFN and non-MBSFN sub-frames). At the same time, measuring on only the first reference symbol of the first slot leads to reduced measurement performance and is thus undesirable.

Thus, the user equipment should preferably know which sub-frames are non-MBSFN sub-frames in order to be able to utilize the full set of reference symbols of these sub-frames for measurements. For the own cell, this information is available to the user equipment. However, the inventors have recognized that it would also be desirable for the user equipment to know which sub-frames of neighbor cells are non-MBSFN sub-frames in order to be able to utilize the full set of reference symbols of these sub-frames for measurements on these neighbor cells.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a network unit (e.g., a radio base station) of an own cell in a radio communication system that utilizes a radio interface that includes a radio frame, each radio frame comprising a plurality of sub-frames. The own cell serves one or more user equipments. Such operation includes obtaining information about a scheduling of Multimedia Broadcast Multicast Service (MBMS) Single Frequency Network (MBSFN) data transmissions in one or more neighboring cells. The information thereby obtained is used to generate an information signal that, for a given sub-frame, enables the one or more user equipments to determine whether neighboring cell measurements can be performed using a unicast group of Orthogonal Frequency Division Multiple access (OFDM) symbols. The information signal is transmitted to the one or more user equipments.

In some embodiments, the given sub-frame consists of first and second slots; the unicast group of OFDM symbols consists of a first and third from last OFDM symbol of each one of the first and second slots.

In some embodiments, the network unit is a node in a hierarchy of network nodes; and the information about the scheduling of MBSFN data transmissions in one or more neighboring cells is obtained from a hierarchically higher node in the radio network.

In alternative embodiments, the information about the scheduling of MBSFN data transmissions in one or more neighboring cells is obtained from a radio base station of a neighboring cell. This can take place via, for example, signaling on an X2-interface.

In another aspect, various objects are achieved in methods and apparatuses for operating user equipment located in a serving cell of a radio communication system, the radio communication system utilizing a radio interface that includes a radio frame, each radio frame comprising a plurality of sub-frames. Such operation includes receiving an information signal from a network unit of the serving cell, the information signal enabling the user equipment to determine whether, for a given sub-frame, neighboring cell measurements can be performed using a unicast group of Orthogonal Frequency Division Multiple access (OFDM) symbols. The received information signal is used to determine in which one of a plurality of measurement modes the user equipment will operate when performing measurements on a signal transmitted by the neighboring cell, wherein the plurality of measurement modes includes a unicast measurement mode and an MBSFN measurement mode.

In some of these embodiments, the given sub-frame consists of first and second slots; the unicast group of OFDM symbols consists of a first and third from last OFDM symbol of each one of the first and second slots; and an MBSFN group of OFDM symbols consist of the first OFDM symbol of the first slot.

In some embodiments, the MBSFN measurement mode of measurement comprises measuring only on the MBSFN group of OFDM symbols in the given sub-frame.

In some of these embodiments, the MBSFN measurement mode of measurement comprises receiving, from the own cell, information about a maximum permissible bandwidth over which measurements of a neighbor cell may be performed; and performing measurements of the neighbor cell's MBSFN sub-frames over the maximum permissible bandwidth.

In alternative embodiments, the MBSFN measurement mode of measurement comprises refraining from measuring during any given sub-frame in which the cell-specific reference symbols of the neighboring cell are located in an MBSFN group of OFDM symbols.

Various aspects of the invention can be embodied within a network unit of a cell in a radio communication system, the cell serving one or more user equipments.

Other aspects of the invention can be embodied within user equipment located in a serving cell of a radio communication system.

BRIEF DESCRIPTION OF THE DRAWINGS

The objects and advantages of the invention will be understood by reading the following detailed description in conjunction with the drawings in which.

DETAILED DESCRIPTION

Figure 1A:
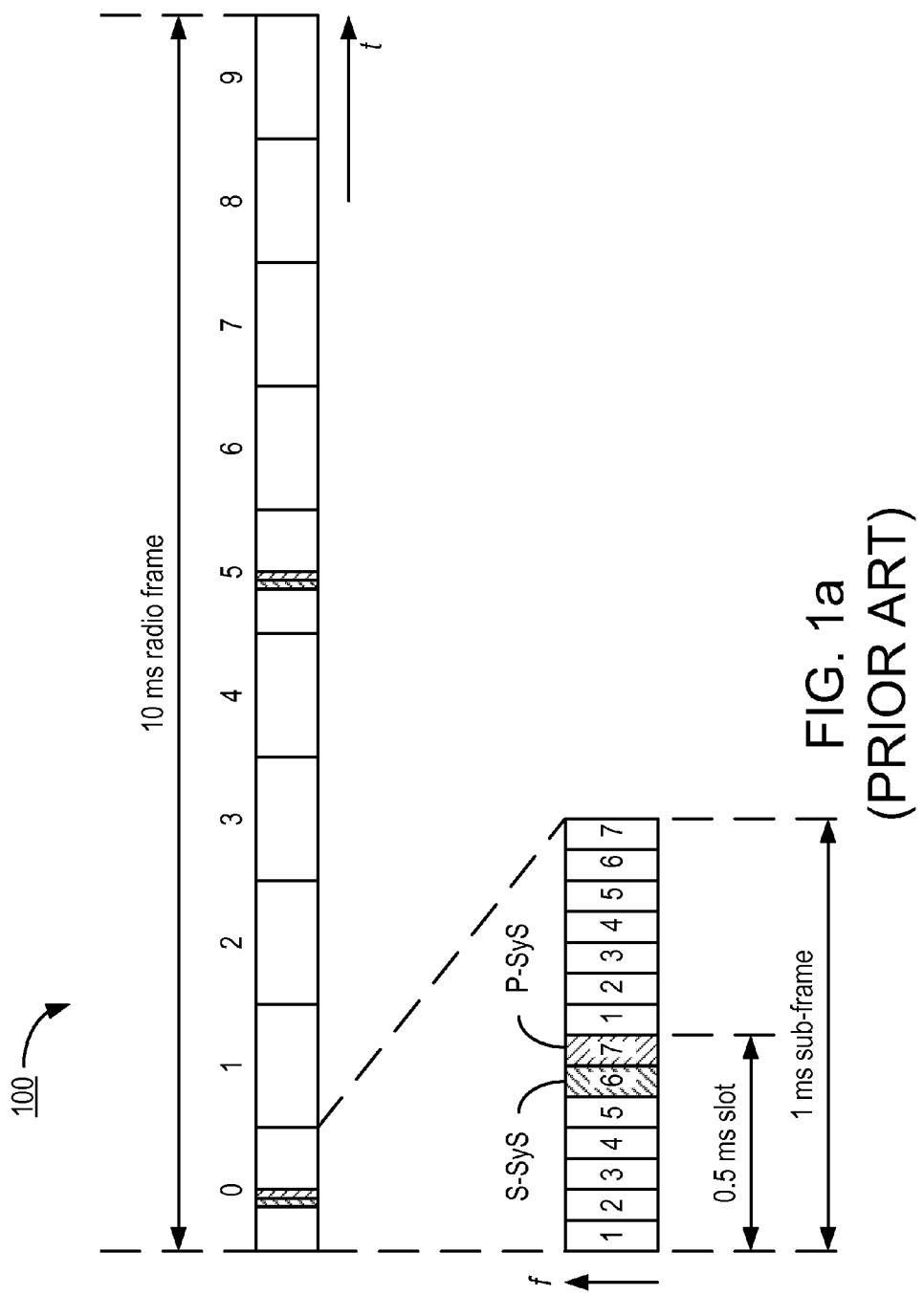
FIG. 1a is an illustration of a radio frame as used in, for example, a 3G LTE system.
Figure 1B:
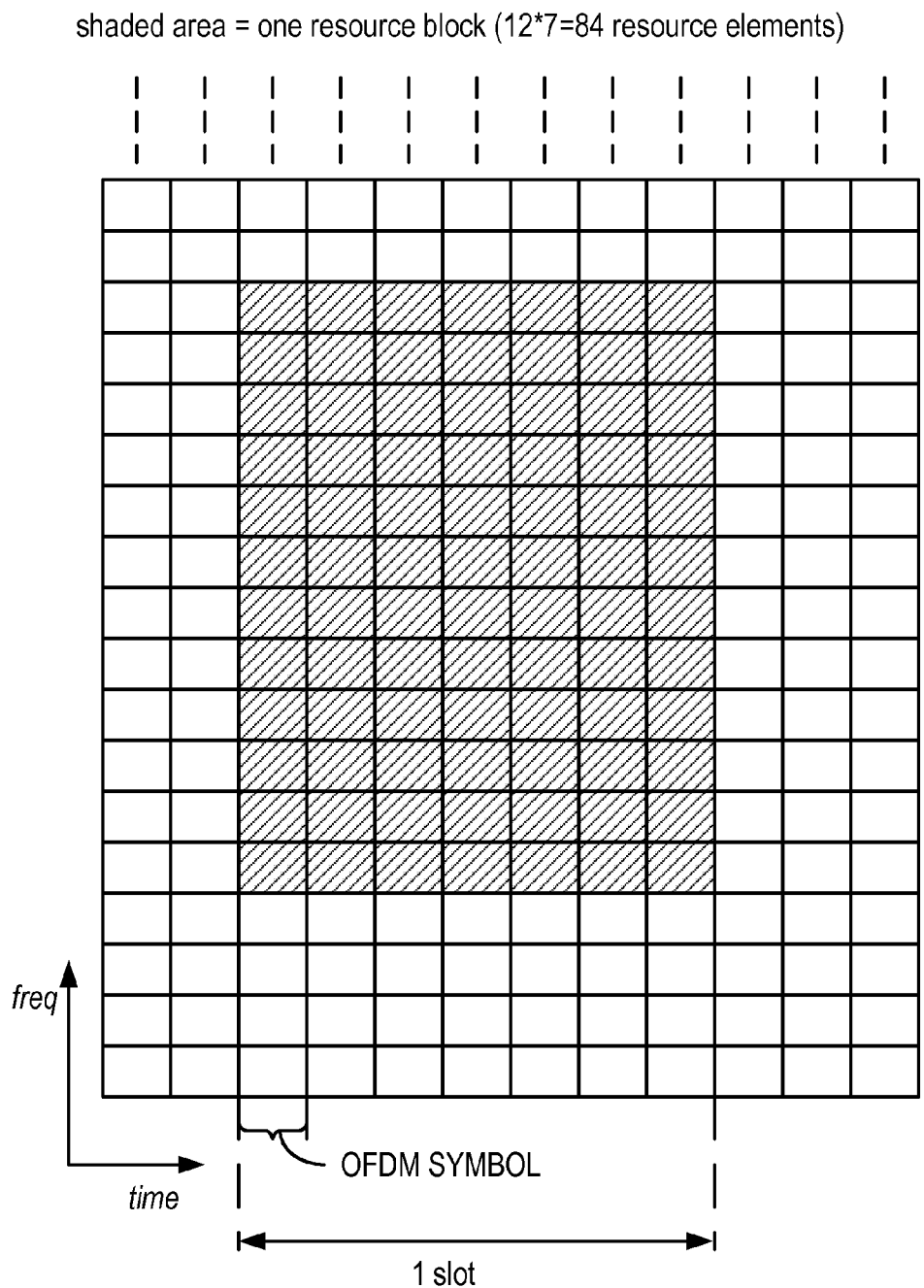
FIG. 1b is an exemplary time/frequency grid showing resource elements/symbols for downlink transmission.
Figure 2:
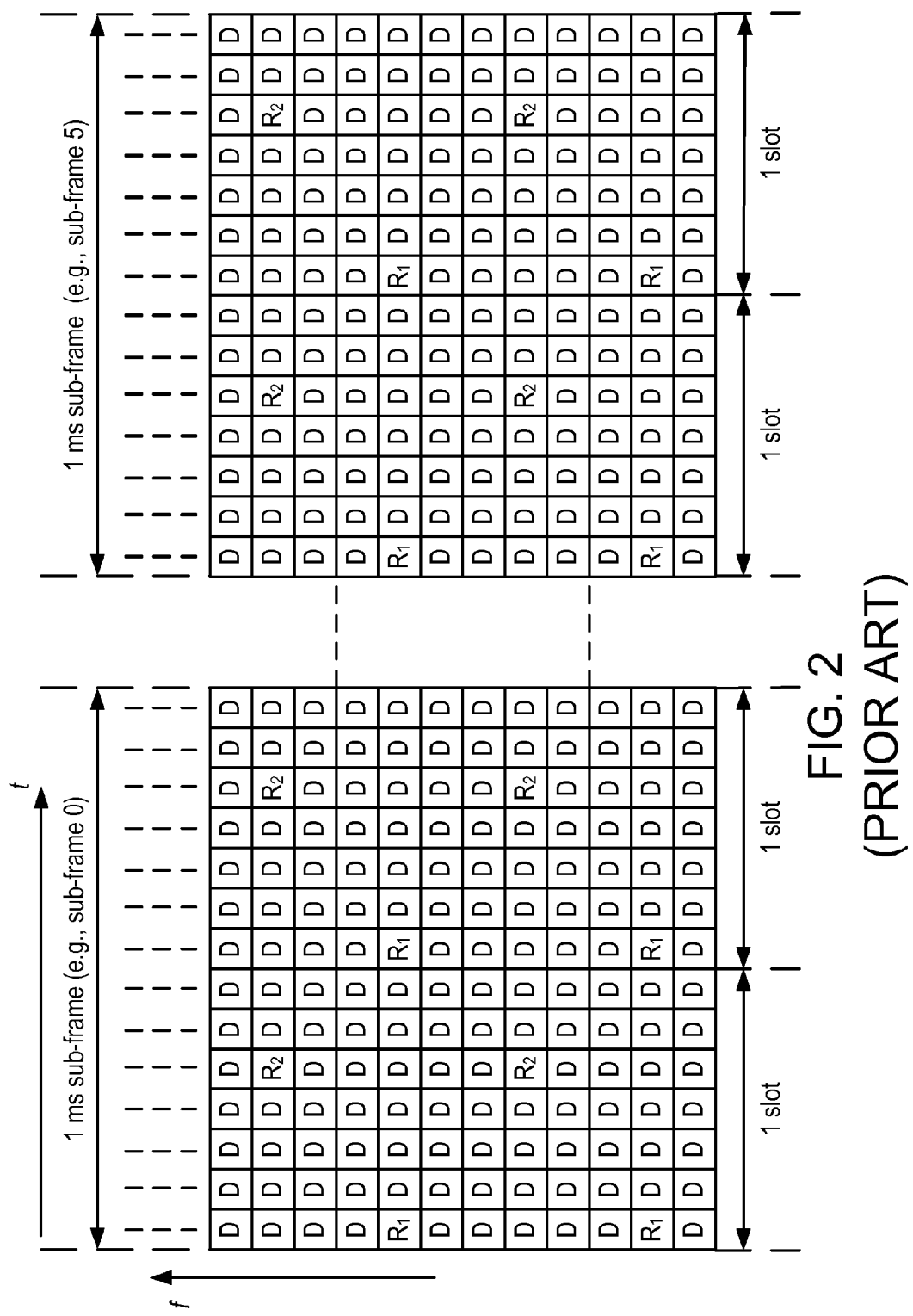
FIG. 2 is a diagram of a proposed pilot (reference symbol) pattern in the frequency (f) and time (t) dimension for a system such as the LTE system.
Figure 3:
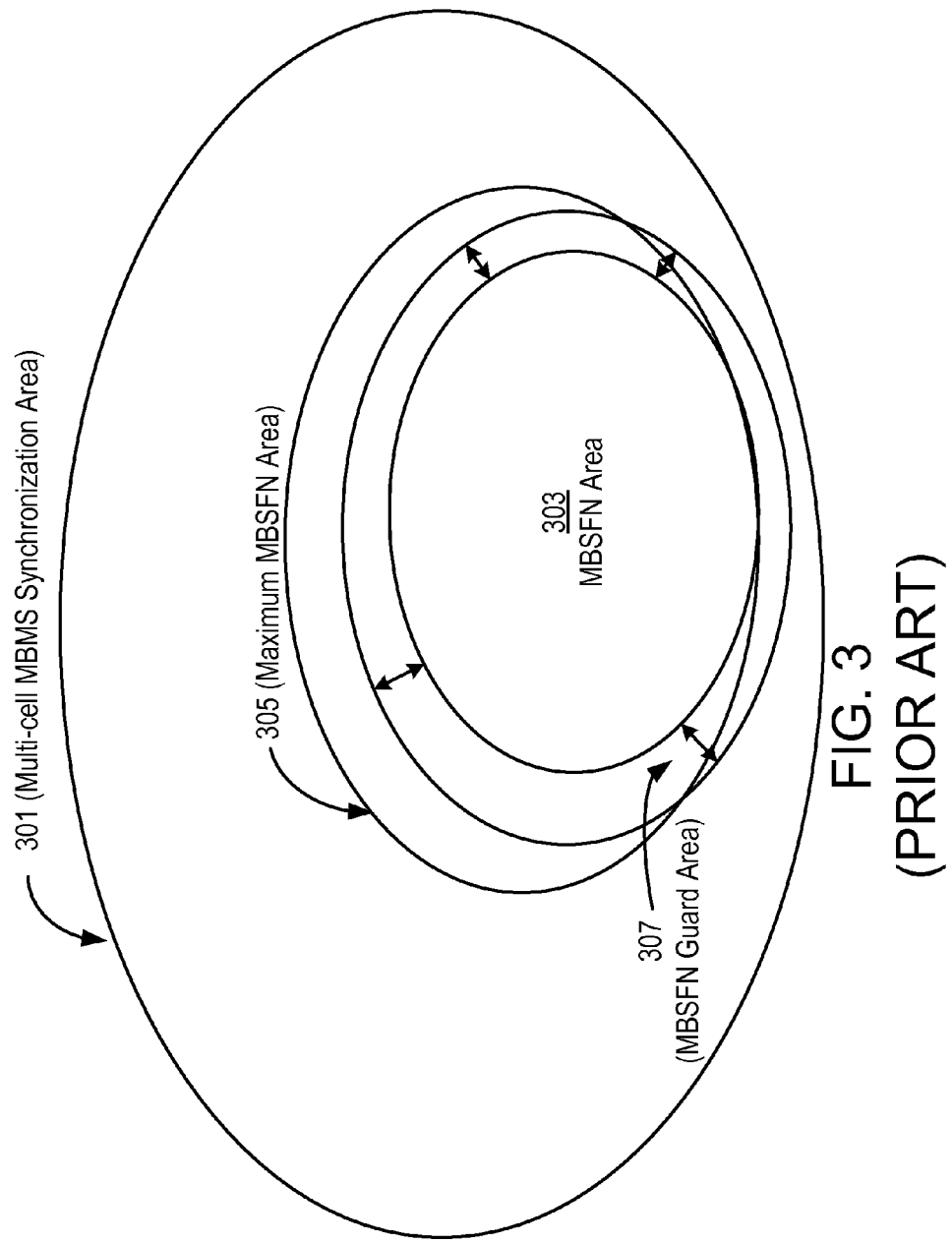
FIG. 3 is an illustration of various concepts relating to MBSFN operation in a system such as the LTE system.
Figure 4:
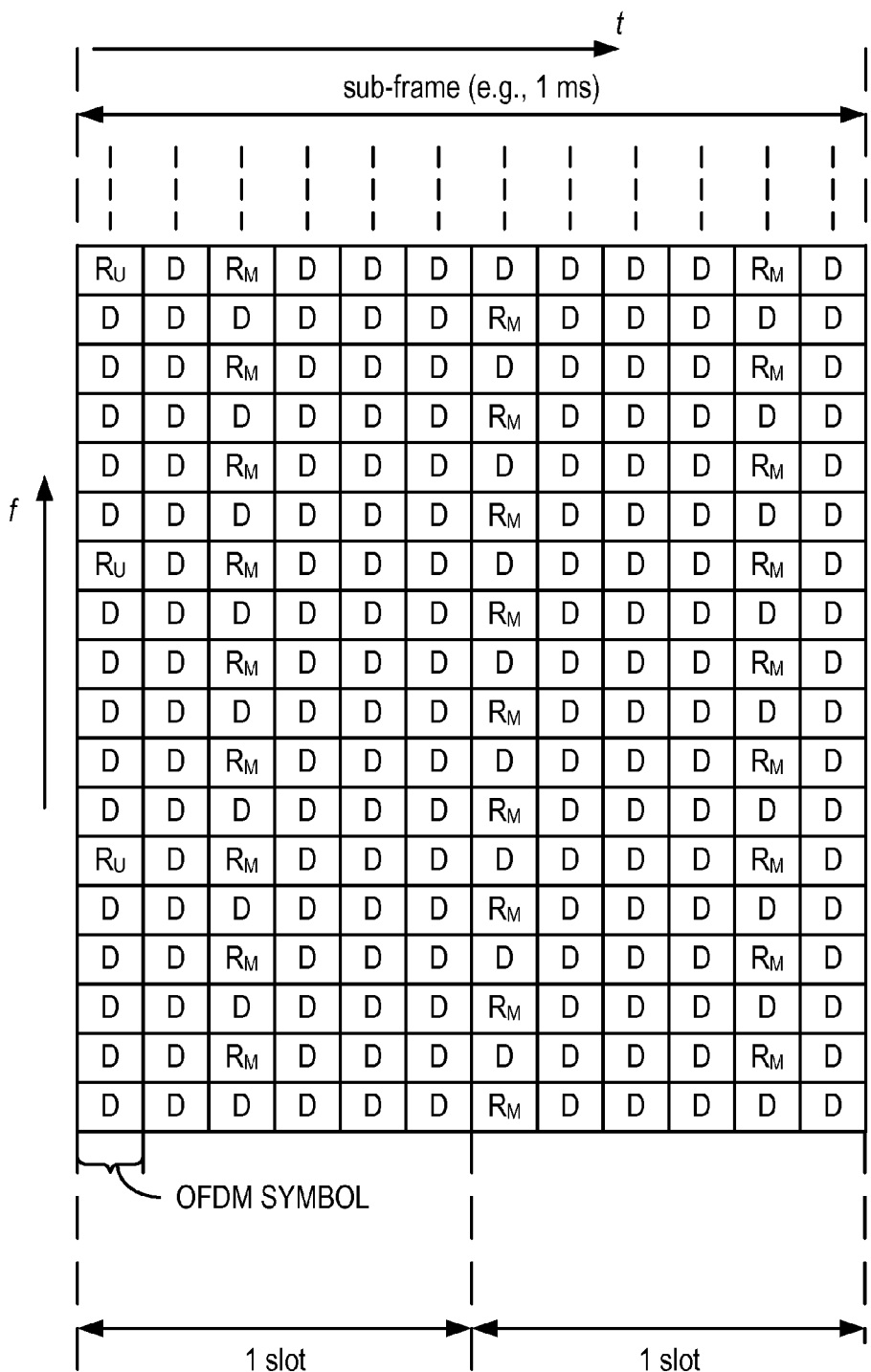
FIG. 4 illustrates an MBSFN reference symbol pattern for one sub-frame, with extended cyclic prefix and 18 subcarriers for 15 kHz subcarrier spacing.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk, containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of embodiments consistent with the invention, methods and apparatuses provide a mechanism whereby user equipment is able to obtain appropriate reference symbols for neighbor cell measurements (e.g., measurements for handover) for each of the neighbor cell's possible modes of operation (including, e.g., unicast and MBSFN in MBSFN areas other than the user equipment's serving cell's own MBSFN area). This involves the serving cell signaling to the user equipment information about when there are one or more scheduled MBSFN transmissions that belong to MBSFN areas other than the serving cell's own MBSFN area.

In another aspect of embodiments consistent with the invention, the user equipment can respond to the information regarding such MBSFN transmissions in a predefined way. For example, when a neighboring cell's MBSFN transmissions are taking place, the user equipment can take measurements only on the reduced number of cell-specific reference symbols that exist in the MBSFN sub-frames. As an alternative example, the user equipment can be caused to refrain from taking any measurements during certain sub-frames, for instance those with MBSFN transmission.

In still another aspect, MBSFN transmission in the MBSFN area(s) of the serving cell will also be known to the UE, so both intra- and inter-cell measurements can be done in the same way.

For the alternative in which the user equipment is ordered to measure on the reduced number of cell-specific reference symbols in a sub-frame with MBSFN data transmission, an embodiment of the invention causes, for those measurements, an increase of the bandwidth over which the measurements occur. This is done for the purpose of collecting more energy in each measurement sample. If the user equipment is to measure over more than just the minimum possible bandwidth, the network should inform the user equipment what the maximum bandwidth is that the user equipment is permitted to measure on. In some systems, this maximum bandwidth will be the same as or smaller than the minimum of the serving cell bandwidth and the smallest bandwidth of the potential target cells. In alternative embodiments, the user equipment may be permitted to measure over a larger bandwidth if the bandwidth of the potential target cell is larger than that of the serving cell.

For the eNodeB to signal the above-described information signal to the user equipment (i.e., the information signal that is used by the user equipment to determine how to configure the measurement pattern, that is, how the user equipment is supposed to measure in the different sub-frames), the eNodeB must obtain information about, for example, the scheduling of MBSFN transmissions that are not associated with the eNodeB's own MBSFN area. In an aspect of some embodiments consistent with the invention, the eNodeB (which is a node in a hierarchy of nodes) obtains this information from a hierarchically higher node that is responsible for MBSFN scheduling. In alternative embodiments, the eNodeB obtains this information a neighboring eNodeBs via, for example, signaling on an X2 interface.

Figure 5:
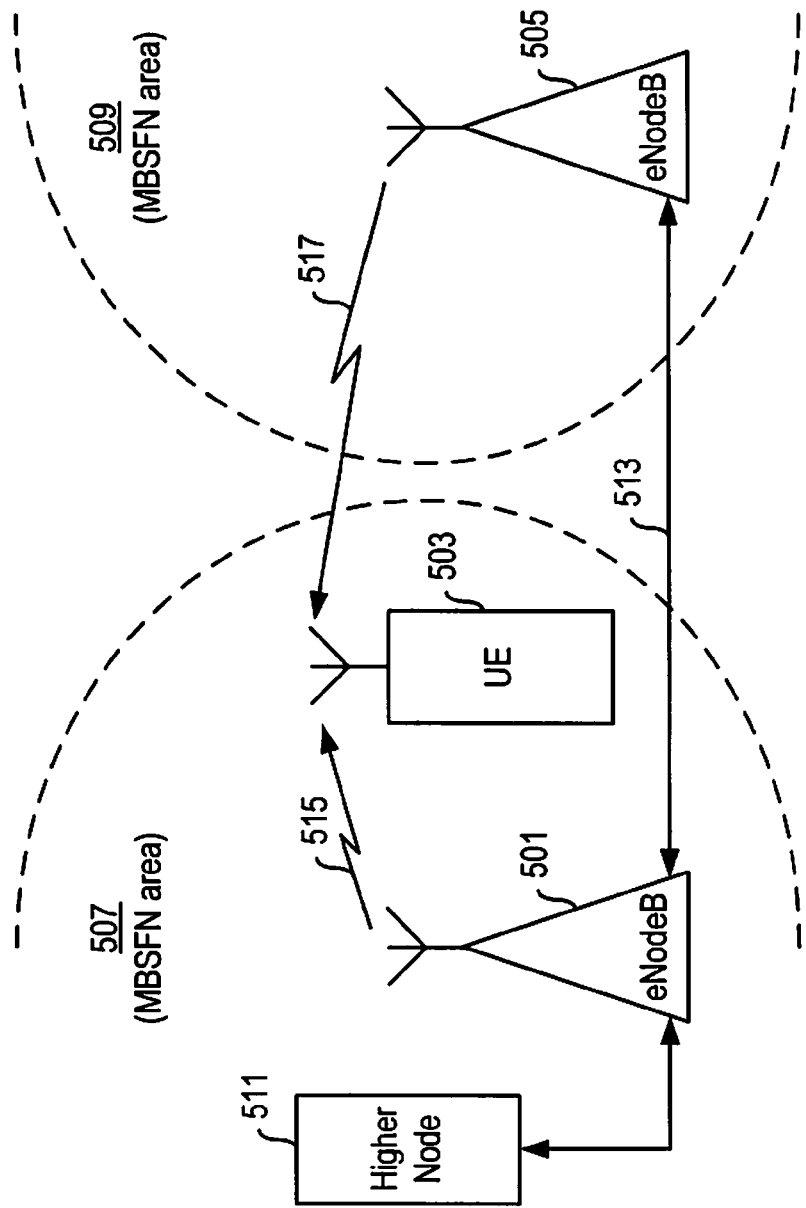
FIG. 5 is a block diagram of an eNodeB and user equipment, each adapted to carry out aspects of the invention.

The above and other aspects will now be further described in connection with FIGS. 5, 6a, 6b, and 7. FIG. 5 is a block diagram of a first eNodeB 501 and user equipment (UE) 503, each adapted to carry out aspects of the invention. In this illustration, the eNodeB 501 serves a cell in which the user equipment 503 is located. A neighboring cell is served by a second eNodeB 505.

The radio communication system, of which the first and second eNodeB's 501, 505 are a part, allows but does not require MBSFN transmissions by its eNodeB's. Consequently, at any given time the first eNodeB 501 may or may not be active in a first MBSFN area 507. Similarly, at any given time the second eNodeB 505 may or may not be active in a second MBSFN area 509. Of relevance to this example is that the first and second MBSFN areas 507, 509 are not the same. This means that participation in the first MBSFN area 507 does not equate to participation in the second MBSFN area 509, and vice versa. In alternative examples, the first and second eNodeBs 501, 505 could participate in a same MBSFN area (not shown), in which case the first eNodeB's knowledge of its own transmission pattern (i.e., unicast versus MBFSN transmissions in any given sub-frame) would, by definition, also inform of the second eNodeB's transmission pattern. However, this is not the case in the present example.

Figure 6A:
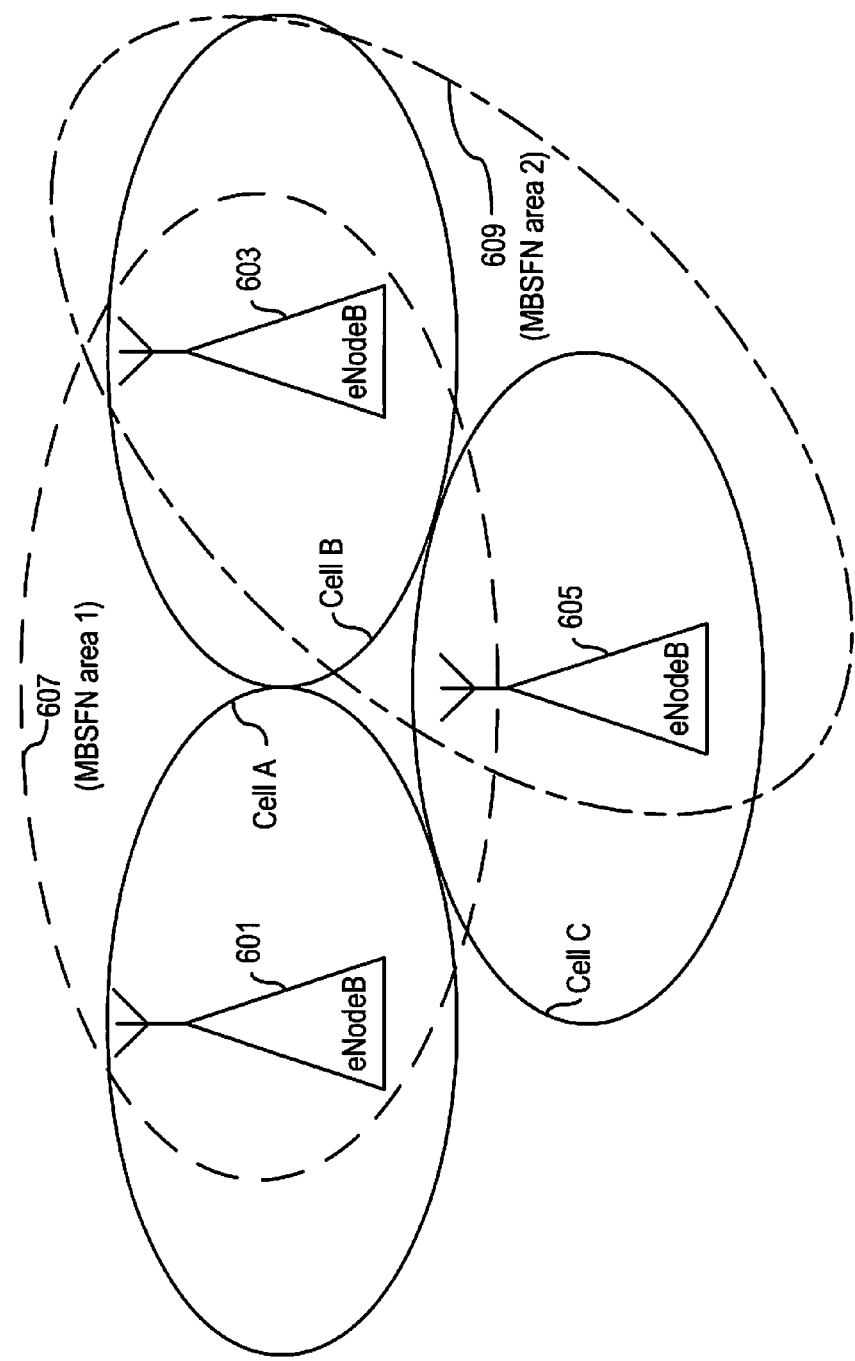
FIG. 6a is a diagram illustrating an exemplary arrangement in which three cells provide two MBSFN coverage areas, each MBSFN coverage area spanning more than one cell.

The situation is a bit more complicated when more than two cells are involved. FIG. 6a illustrates one such example involving a first eNodeB 601, a second eNodeB 603, and a third eNodeB 605. The first eNodeB 601 serves Cell A, the second eNodeB 603 serves Cell B, and the third eNodeB 605 serves Cell C. In this example, each of the three cells is a neighbor of the other two.

Figure 6B:
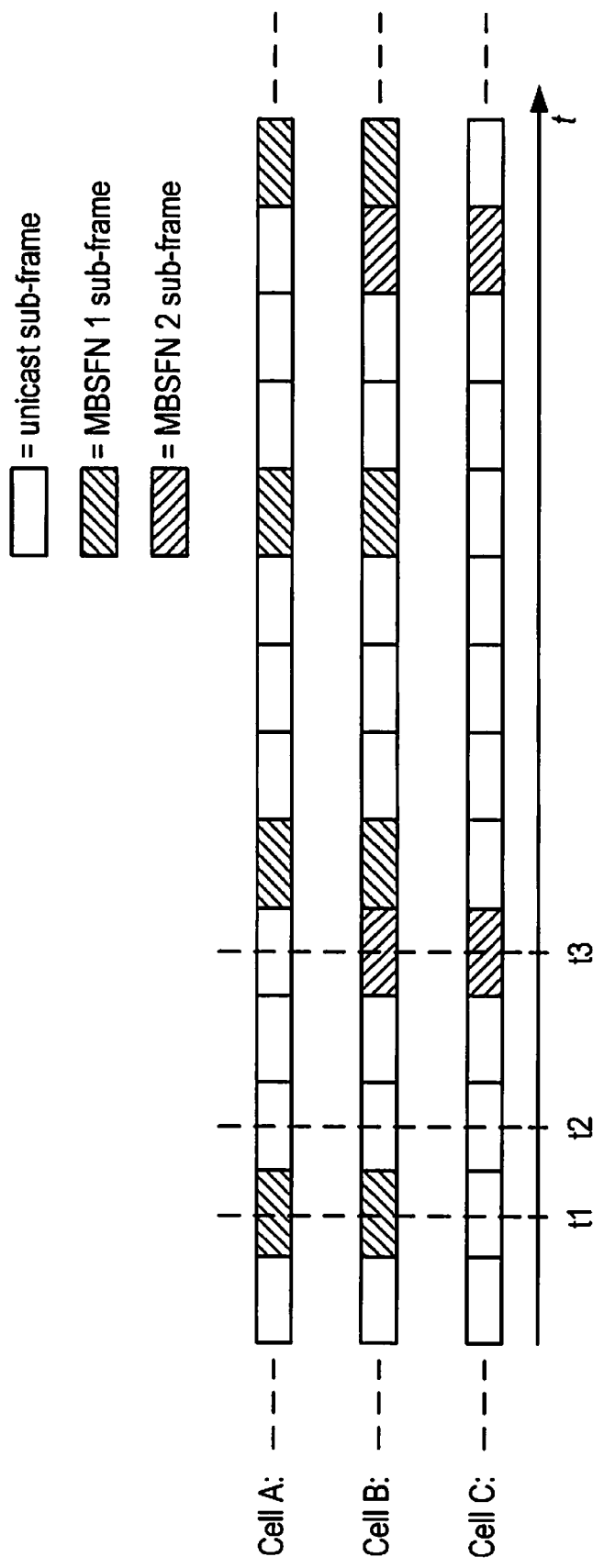
FIG. 6b is a timing diagram illustrating a time multiplexed scheduling of MBMS sub-frames that allows a cell to participate in two MBSFN areas.

Further in this example, there are two MBMS services to be provided: one MBMS service covering Cell A and Cell B (MBSFN area 1), and a second MBMS service covering Cell B and Cell C (MBSFN area 2). It will be observed that Cell B is a participant in both MBMS services. For this to be possible, the two MBSFN services need to be time multiplexed (i.e., transmitted in different sub-frames). FIG. 6b illustrates this type of scheduling. As can be seen, the MBSFN sub-frames for MBSFN area 1 never occur at the same time as the MBSFN sub-frames for MBSFN area 2. In this example, there are three possibilities at any one time: Cell A and Cell B can be engaged in MBSFN transmissions for MBSFN area 1 while Cell C is engaged in unicast transmissions (e.g., at time t1); Cell A, Cell B, and Cell C can each be engaged in unicast transmissions (e.g., at time t2); and Cell A can be engaged in unicast transmissions while Cell B and Cell C are engaged in MBSFN transmissions for MBSFN area 2 (e.g., at time t3).

This illustration shows that, from the point of view of a UE operating in any one of these three cells, it would be helpful to have information that enables it to determine whether cell-specific reference symbols of one or more neighboring cells are located in a unicast group of Orthogonal Frequency Division Multiple access (OFDM) symbols because an affirmative answer to that question would enable that user equipment to perform neighboring cell measurements using a unicast group of Orthogonal Frequency Division Multiple access (OFDM) symbols.

Figure 7:
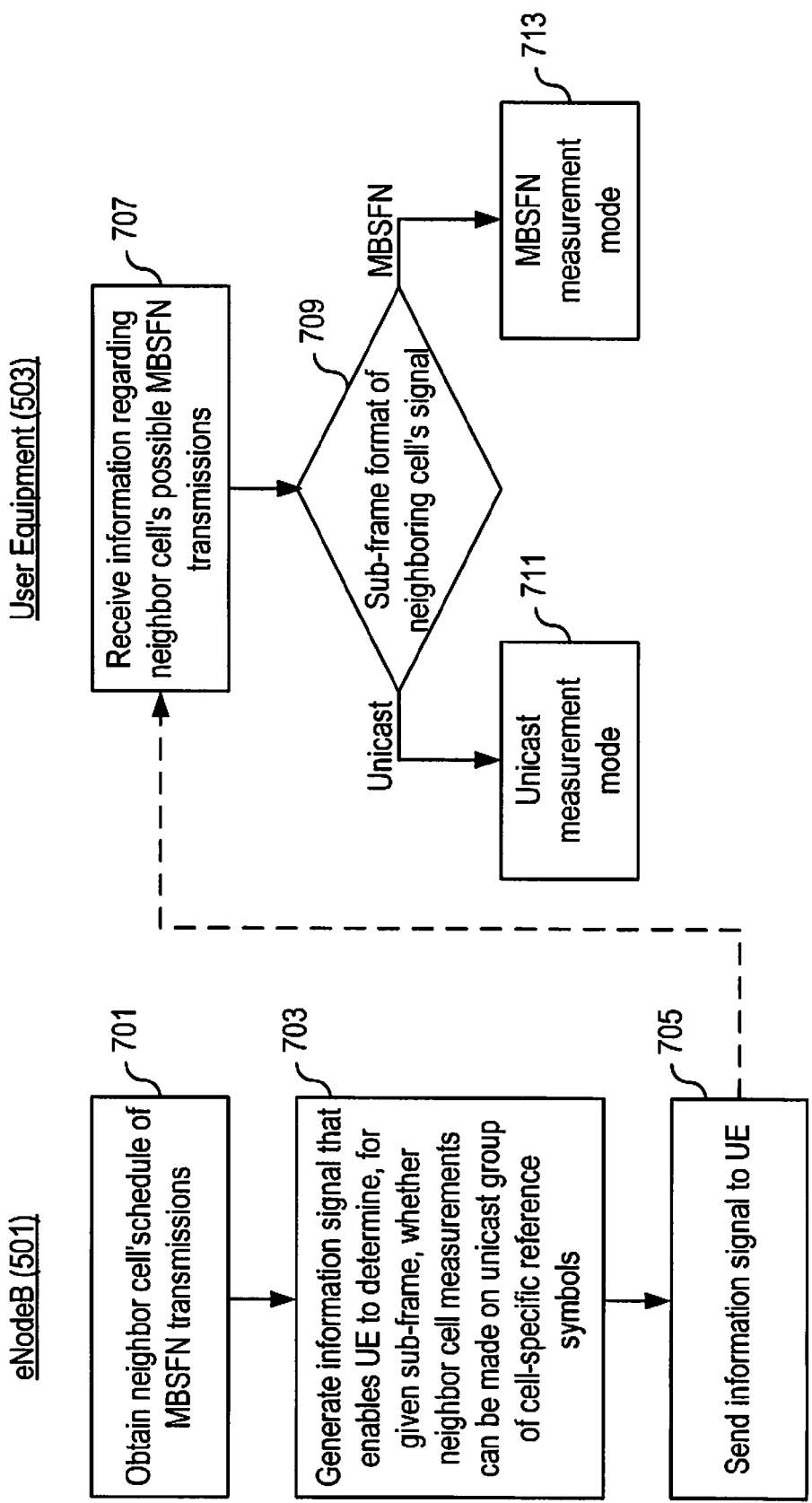
FIG. 7 is a flow chart showing processes/steps variously carried out in an eNodeB and in user equipment in accordance with aspects of embodiments consistent with the invention.

FIG. 7 is a flow chart showing processes/steps variously carried out in an eNodeB (e.g., any of the eNodeB B's 501, 503, 601, 603, 605) and in user equipment (e.g., the user equipment 503). Referring to FIG. 7 and still to FIG. 5 for use as a non-limiting example, the situation is resolved by the first eNodeB 501 obtaining information about a scheduling of Multimedia Broadcast Multicast Service (MBMS) Single Frequency Network (MBSFN) data transmissions, including those that are not associated with an MBSFN area of the own cell (step 701). This information can be obtained in any of a number of ways. For example, the eNodeB 501 is a network unit in the radio communication system that comprises a hierarchy of network nodes. The eNodeB 501 can obtain the information about the scheduling of MBSFN data transmissions that are not associated with its own MBSFN area 507 (e.g., information about MBSFN data transmissions associated with the second MBSFN area 509) from a hierarchically higher node 511 in the radio network.

In alternative embodiments, the first eNodeB 501 obtains the information about the scheduling of MBSFN data transmissions that are not associated with its own MBSFN area 507 (e.g., information about MBSFN data transmissions associated with the second MBSFN area 509) from a radio base station (e.g., second eNodeB 505) of the neighboring cell. This communication can take place via, for example, an X2-interface 513.

The first eNodeB 501 then uses the information about the scheduling of MBSFN data transmissions that are not associated with its own MBSFN area (e.g., the first MBSFN area 507, if there is one) to generate an information signal 515 that, for a given sub-frame, informs the user equipment 503 whether neighboring cell measurements (e.g., measurements of signals from the cell served by the second eNodeB 505) can be made on a unicast group of cell-specific reference symbols (step 703). The information signal thus provides a measuring pattern to the user equipment (i.e., an indication of how the user equipment is supposed to measure in the different sub-frames). The signal can, for example, be generated by creating a signal whose informational content informs the user equipment 503 of those sub-frames when there are one or more scheduled MBSFN transmissions of neighboring cells that belong to MBSFN areas other than any MBSFN areas of the serving cell. The eNodeB 501 then transmits the information signal 515 (step 705) to the user equipment of the cell that it serves (e.g., the user equipment 503).

The user equipment 503 then receives the information signal 515 (step 707), and uses it to determine in which one of a plurality of measurement modes the user equipment will operate when performing measurements on a signal transmitted by the neighboring cell (decision block 709). The plurality of measurement modes includes a unicast measurement mode and an MBSFN measurement mode.

If a sub-frame of a neighboring cell (e.g., the second eNodeB 505) is formatted as a unicast sub-frame ("UNICAST" path out of decision block 709), the user equipment 503 performs measurements of its neighboring cell (e.g., second eNodeB 505) in the conventional way (herein denoted, "unicast measurement mode") (step 711), which involves expecting the neighboring cell's cell-specific reference symbols to be located in the first and third from last OFDM symbols of each of the sub-frame's first and second slots.

However, if a sub-frame of a neighboring cell (e.g., the second eNodeB 505) is formatted as an MBSFN sub-frame ("MBSFN" path out of decision block 709), the user equipment 503 performs measurements of its neighboring cell (e.g., second eNodeB 505) in a mode (herein denoted "MBSFN measurement mode") (step 713) that takes into account the fact that the neighboring cell's cell-specific reference symbols are located only in an MBSFN group of OFDM symbols (e.g., in the LTE system, the MBSFN group of OFDM symbols are the first OFDM symbol of the first slot of an MBSFN sub-frame.)

In some embodiments, performing measurements of a neighboring cell in the MBSFN measurement mode includes measuring only on the MBSFN group of OFDM symbols in the given sub-frame (i.e., not taking measurements on the third from last OFDM symbols of the first or second slots, and not taking measurements on the first OFDM symbol of the second slot).

In some, but not necessarily all of these embodiments, the user equipment 503 makes up for the smaller number of measurements by increasing the bandwidth of the measurements. Information about a maximum permissible measurement bandwidth is preferably provided to the user equipment by the own cell.

In alternative embodiments, performing measurements of a neighboring cell in the MBSFN measurement mode includes refraining from measuring during any given sub-frame in which the cell-specific reference symbols of the neighboring cell are located in an MBSFN group of OFDM symbols. This means that the user equipment 503 limits its measurements to only those sub-frames in which the cell-specific reference symbols are located in a unicast group of OFDM symbols (e.g., in an LTE system, the first and third from last OFDM symbols of each of the sub-frame's first and second slots.)

An advantage of the invention is that the user equipment's measuring of neighboring cells in connection with handover in LTE Radio Access Networks with MBSFN transmission will be assured of measuring only the available unicast reference symbols regardless of whether the neighboring cell is engaged in MBSFN transmissions or not. This makes the measurements more accurate and safer, which in turn facilitates handovers and reduces the risk of dropped calls.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of operating a network unit of an own cell in a radio communication system that utilizes a radio interface that includes a radio frame, each radio frame comprising a plurality of sub-frames, the own cell serving one or more user equipments, the method comprising:
   obtaining information about a scheduling of Multimedia Broadcast Multicast Service (MBMS) Single Frequency Network (MBSFN) data transmissions in one or more neighboring cells;
   using the information about the scheduling of MBSFN data transmissions in the one or more neighboring cells to generate an information signal that, for a given sub-frame, enables the one or more user equipments to determine whether neighboring cell measurements can be performed by means of a unicast measurement mode of operation or by means of an MBSFN measurement mode of operation; and
   transmitting the information signal to the one or more user equipments,
   wherein:
   the unicast measurement mode of operation is adapted to base measurements on cell-specific reference symbols contained in a unicast sub-frame;

the MBSFN measurement mode of operation is adapted to base measurements on cell-specific reference symbols contained in an MBSFN sub-frame;

the cell-specific reference symbols contained in the unicast sub-frame are an extended set compared to the set of cell-specific reference symbols in the MBSFN sub-frame; and obtaining the information about the scheduling of MBSFN data transmissions in one or more neighboring cells comprises obtaining the information about the scheduling of MBSFN data transmissions in one or more neighboring cells from a radio base station of a neighboring cell.

2. The method of claim 1, wherein:

the given sub-frame consists of first and second slots;

the cell-specific reference symbols contained in the unicast sub-frame consist of cell-specific reference symbols contained in a first and third from last OFDM symbol of each one of the first and second slots; and the cell-specific reference symbols contained in the MBSFN sub-frame consist of cell-specific reference symbols contained in the first OFDM symbol of the first slot.

3. The method of claim 1, wherein:

the network unit is a node in a hierarchy of network nodes.

4. The method of claim 1, wherein the network unit is a radio base station.

5. The method of claim 1, wherein obtaining the information about the scheduling of MBSFN data transmissions in one or more neighboring cells from the radio base station of the neighboring cell comprises using signaling on an X2-interface.

6. A method of operating user equipment located in a serving cell of a radio communication system, the radio communication system utilizing a radio interface that includes a radio frame, each radio frame comprising a plurality of sub-frames, the method comprising:

receiving an information signal from a network unit of the serving cell, the information signal enabling the user equipment to determine whether, for a given sub-frame, neighboring cell measurements can be performed by means of a unicast measurement mode of operation or by means of an MBSFN measurement mode of operation; and using the received information signal to determine in which one of a plurality of measurement modes of operation the user equipment will operate when performing measurements on a signal transmitted by the neighboring cell, wherein the plurality of measurement modes of operation includes the unicast measurement mode of operation and the MBSFN measurement mode of operation, wherein:

the unicast measurement mode of operation is adapted to base measurements on cell-specific reference symbols contained in a unicast sub-frame;

the MBSFN measurement mode of operation is adapted to base measurements on cell-specific reference symbols contained in an MBSFN sub-frame;

the cell-specific reference symbols contained in the unicast sub-frame are an extended set compared to the set of cell-specific reference symbols in the MBSFN sub-frame;

the given sub-frame consists of first and second slots;

the cell-specific reference symbols contained in the unicast sub-frame consist of cell-specific reference symbols contained in a first and third from last OFDM symbol of each one of the first and second slots;

the cell-specific reference symbols contained in the MBSFN sub-frame consists of cell-specific reference symbols contained in the first OFDM symbol of the first slot; and the MBSFN measurement mode of operation comprises measuring only on the cell-specific reference symbols contained in the given sub-frame when the given sub-frame is the MBSFN sub-frame.

7. A method of operating user equipment located in a serving cell of a radio communication system, the radio communication system utilizing a radio interface that includes a radio frame, each radio frame comprising a plurality of sub-frames, the method comprising:

receiving an information signal from a network unit of the serving cell, the information signal enabling the user equipment to determine whether, for a given sub-frame, neighboring cell measurements can be performed by means of a unicast measurement mode of operation or by means of an MBSFN measurement mode of operation; and using the received information signal to determine in which one of a plurality of measurement modes of operation the user equipment will operate when performing measurements on a signal transmitted by the neighboring cell, wherein the plurality of measurement modes of operation includes the unicast measurement mode of operation and the MBSFN measurement mode of operation, wherein:

the unicast measurement mode of operation is adapted to base measurements on cell-specific reference symbols contained in a unicast sub-frame;

the MBSFN measurement mode of operation is adapted to base measurements on cell-specific reference symbols contained in an MBSFN sub-frame;

the cell-specific reference symbols contained in the unicast sub-frame are an extended set compared to the set of cell-specific reference symbols in the MBSFN sub-frame;

the given sub-frame consists of first and second slots;

the cell-specific reference symbols contained in the unicast sub-frame consist of cell-specific reference symbols contained in a first and third from last OFDM symbol of each one of the first and second slots;

the cell-specific reference symbols contained in the MBSFN sub-frame consists of cell-specific reference symbols contained in the first OFDM symbol of the first slot; and the MBSFN measurement mode of operation comprises:

receiving, from the own cell, information about a maximum permissible bandwidth over which measurements of a neighbor cell may be performed; and performing measurements of the neighbor cell's MBSFN sub-frames over the maximum permissible bandwidth.

8. A method of operating user equipment located in a serving cell of a radio communication system, the radio communication system utilizing a radio interface that includes a radio frame, each radio frame comprising a plurality of sub-frames, the method comprising:

receiving an information signal from a network unit of the serving cell, the information signal enabling the user equipment to determine whether, for a given sub-frame, neighboring cell measurements can be performed by means of a unicast measurement mode of operation or by means of an MBSFN measurement mode of operation; and using the received information signal to determine in which one of a plurality of measurement modes of operation the user equipment will operate when performing measurements on a signal transmitted by the neighboring cell, wherein the plurality of measurement modes of operation includes the unicast measurement mode of operation and the MBSFN measurement mode of operation, wherein:

the unicast measurement mode of operation is adapted to base measurements on cell-specific reference symbols contained in a unicast sub-frame;

the MBSFN measurement mode of operation is adapted to base measurements on cell-specific reference symbols contained in an MBSFN sub-frame;

the cell-specific reference symbols contained in the unicast sub-frame are an extended set compared to the set of cell-specific reference symbols in the MBSFN sub-frame; and the MBSFN measurement mode of measurement comprises refraining from measuring during the given sub-frame when the given sub-frame is the MBSFN sub-frame.

9. A network unit of an own cell in a radio communication system that utilizes a radio interface that includes a radio frame, each radio frame comprising a plurality of sub-frames, the own cell serving one or more user equipments, wherein the network unit comprises:

circuitry configured to obtain information about a scheduling of Multimedia Broadcast Multicast Service (MBMS) Single Frequency Network (MBSFN) data transmissions in one or more neighboring cells;

circuitry configured to use the information about the scheduling of MBSFN data transmissions in the one or more neighboring cells to generate an information signal that, for a given sub-frame, enables the one or more user equipments to determine whether neighboring cell measurements can be performed by means of a unicast measurement mode of operation or by means of an MBSFN measurement mode of operation; and circuitry configured to transmit the information signal to the one or more user equipments, wherein:

the unicast measurement mode of operation is adapted to base measurements on cell-specific reference symbols contained in a unicast sub-frame;

the MBSFN measurement mode of operation is adapted to base measurements on cell-specific reference symbols contained in an MBSFN sub-frame;

the cell-specific reference symbols contained in the unicast sub-frame are an extended set compared to the set of cell-specific reference symbols in the MBSFN sub-frame; and the circuitry configured to obtain the information about the scheduling of MBSFN data transmissions in one or more neighboring cells comprises circuitry configured to obtain the information about the scheduling of MBSFN data transmissions in one or more neighboring cells from a radio base station of a neighboring cell.

10. A user equipment located in a serving cell of a radio communication system, the radio communication system utilizing a radio interface that includes a radio frame, each radio frame comprising a plurality of sub-frames, wherein the user equipment comprises:

circuitry configured to receive an information signal from a network unit of the serving cell, the information signal enabling the user equipment to determine whether, for a given sub-frame, neighboring cell measurements can be performed by means of a unicast measurement mode of operation or by means of an MBSFN measurement mode of operation; and circuitry configured to use the received information signal to determine in which one of a plurality of measurement modes of operation the user equipment will operate when performing measurements on a signal transmitted by the neighboring cell, wherein the plurality of measurement modes of operation includes the unicast measurement mode of operation and the MBSFN measurement mode of operation, wherein:

the unicast measurement mode of operation is adapted to base measurements on cell-specific reference symbols contained in a unicast sub-frame;

the MBSFN measurement mode of operation is adapted to base measurements on cell-specific reference symbols contained in an MBSFN sub-frame;

the cell-specific reference symbols contained in the unicast sub-frame are an extended set compared to the set of cell-specific reference symbols in the MBSFN sub-frame;

the given sub-frame consists of first and second slots;

the cell-specific reference symbols contained in the unicast sub-frame consist of cell-specific reference symbols contained in a first and third from last OFDM symbol of each one of the first and second slots;

the cell-specific reference symbols contained in the MBSFN sub-frame consists of cell-specific reference symbols contained in the first OFDM symbol of the first slot; and the MBSFN measurement mode of operation comprises measuring only on the cell-specific reference symbols contained in the given sub-frame when the given sub-frame is the MBSFN sub-frame.

11. A user equipment located in a serving cell of a radio communication system, the radio communication system utilizing a radio interface that includes a radio frame, each radio frame comprising a plurality of sub-frames, wherein the user equipment comprises:

circuitry configured to receive an information signal from a network unit of the serving cell, the information signal enabling the user equipment to determine whether, for a given sub-frame, neighboring cell measurements can be performed by means of a unicast measurement mode of operation or by means of an MBSFN measurement mode of operation; and circuitry configured to use the received information signal to determine in which one of a plurality of measurement modes of operation the user equipment will operate when performing measurements on a signal transmitted by the neighboring cell, wherein the plurality of measurement modes of operation includes the unicast measurement mode of operation and the MBSFN measurement mode of operation, wherein:

the unicast measurement mode of operation is adapted to base measurements on cell-specific reference symbols contained in a unicast sub-frame;

the MBSFN measurement mode of operation is adapted to base measurements on cell-specific reference symbols contained in an MBSFN sub-frame;

the cell-specific reference symbols contained in the unicast sub-frame are an extended set compared to the set of cell-specific reference symbols in the MBSFN sub-frame;

the given sub-frame consists of first and second slots;

the cell-specific reference symbols contained in the unicast sub-frame consist of cell-specific reference symbols contained in a first and third from last OFDM symbol of each one of the first and second slots;

the cell-specific reference symbols contained in the MBSFN sub-frame consists of cell-specific reference symbols contained in the first OFDM symbol of the first slot; and the MBSFN measurement mode of operation comprises:
receiving, from the own cell, information about a maximum permissible bandwidth over which measurements of a neighbor cell may be performed; and
performing measurements of the neighbor cell's MBSFN sub-frames over the maximum permissible bandwidth.

12. A user equipment located in a serving cell of a radio communication system, the radio communication system utilizing a radio interface that includes a radio frame, each radio frame comprising a plurality of sub-frames, wherein the user equipment comprises:

circuitry configured to receive an information signal from a network unit of the serving cell, the information signal enabling the user equipment to determine whether, for a given sub-frame, neighboring cell measurements can be performed by means of a unicast measurement mode of operation or by means of an MBSFN measurement mode of operation; and circuitry configured to use the received information signal to determine in which one of a plurality of measurement modes of operation the user equipment will operate when performing measurements on a signal transmitted by the neighboring cell, wherein the plurality of measurement modes of operation includes the unicast measurement mode of operation and the MBSFN measurement mode of operation, wherein:

the unicast measurement mode of operation is adapted to base measurements on cell-specific reference symbols contained in a unicast sub-frame;

the MBSFN measurement mode of operation is adapted to base measurements on cell-specific reference symbols contained in an MBSFN sub-frame;

the cell-specific reference symbols contained in the unicast sub-frame are an extended set compared to the set of cell-specific reference symbols in the MBSFN sub-frame; and the MBSFN measurement mode of measurement comprises refraining from measuring during
the given sub-frame when the given sub-frame is the MBSFN sub-frame.

* * * * *

UNITED STATES PATENT AND TRADEMARK OFFICE
CERTIFICATE OF CORRECTION

| | | |
|---|---|---|
| PATENT NO. | : 8,249,007 B2 | Page 1 of 1 |
| APPLICATION NO. | : 12/532166 | |
| DATED | : August 21, 2012 | |
| INVENTOR(S) | : Jading et al. | |

It is certified that error appears in the above-identified patent and that said Letters Patent is hereby corrected as shown below:

In the Drawings

In Fig. 7, Sheet 9 of 9, for Tag "701", in Line 1, delete "cell'schedule" and insert -- cell's schedule --, therefor.

In the Specifications

In column 8, Line 25, delete "MBFSN" and insert -- MBSFN --, therefor.

Signed and Sealed this
Sixth Day of May, 2014

Michelle K. Lee
*Deputy Director of the United States Patent and Trademark Office*